July 11, 1961 W. M. QUINN, JR., ET AL 2,992,295
COMBINATION BURST GATE AND BURST ELIMINATION CIRCUIT FOR USE IN COLOR TELEVISION RECEIVERS
Filed Dec. 20, 1954
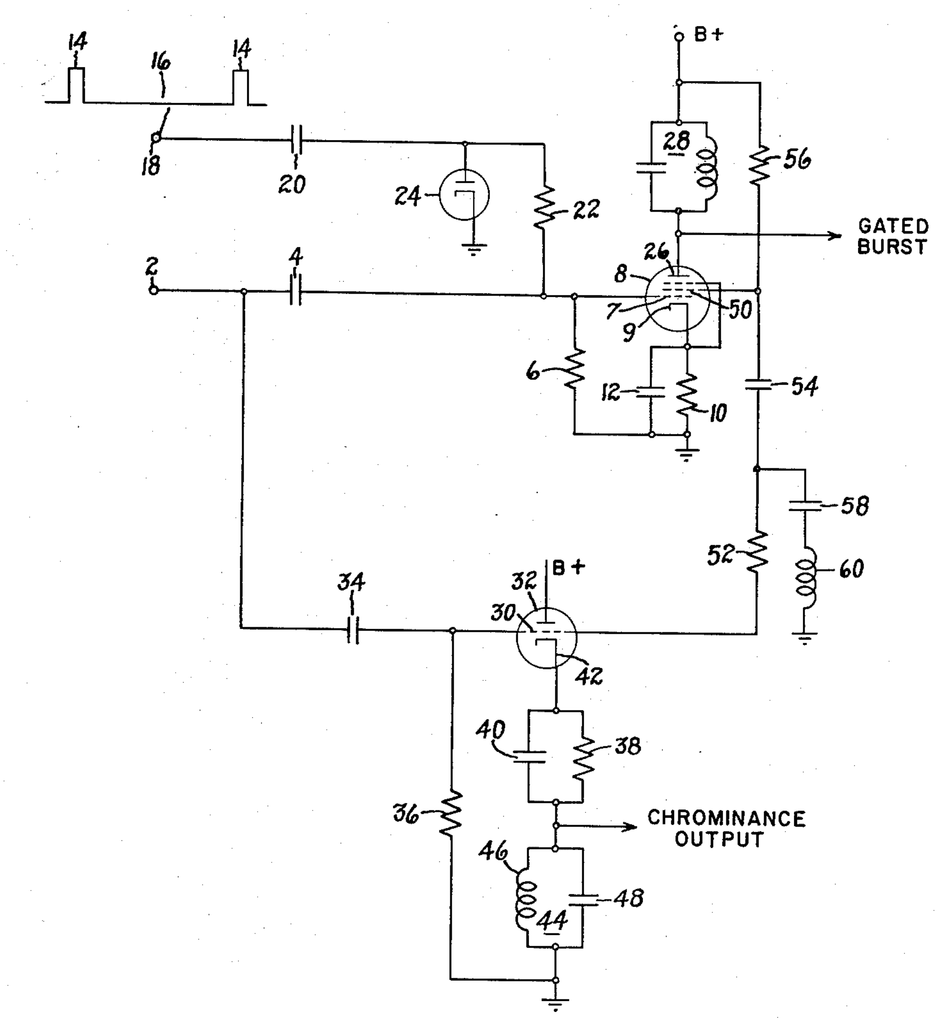
INVENTORS:
THOMAS T. TRUE,
WILL M. QUINN, JR.
BY Donald N. Timbie
THEIR ATTORNEY.

United States Patent Office 2,992,295

Patented July 11, 1961

2,992,295

COMBINATION BURST GATE AND BURST ELIMINATION CIRCUIT FOR USE IN COLOR TELEVISION RECEIVERS

Will M. Quinn, Jr., Baldwinsville, and Thomas T. True, North Syracuse, N.Y., assignors to General Electric Company, a corporation of New York Filed Dec. 20, 1954, Ser. No. 476,166
1 Claim. (Cl. 178—69.5)

This invention relates to improvements in television receivers adapted to reproduce images in color from the presently standardized color television signals.

Although this color television system has been explained in many publications, brief outlines will be herein presented in order that a setting for this invention will be clearly understood.

In this standardized color television system, the transmitting signal includes portions which are similar to the present signal transmitted in the standardized black-and-white television, i.e., it includes line and field synchronizing pulses and video signals representing the brightness of the image. The color information is conveyed by a color carrier located at the upper end of the video spectrum. The color carrier is amplitude-modulated in accordance with the color purity or degree of saturation of the color being transmitted and is phase-modulated in accordance with the hue. Inasmuch as some of the color information is represented by the phase of this color carrier, it is apparent that some reference wave must be transmitted in order to give a basis for comparison. Instead of transmitting a continuous reference wave, only a few cycles of a predetermined phase of the color carrier frequency are transmitted during the blanking interval for each of the scanning lines. At the receiver, these bursts of color carrier frequency are separated from the rest of the signals and circuits are provided for producing under the control of these bursts a continuous reference wave of color carrier frequency having a fixed phase with respect to the cycles in the bursts. Circuits are also provided for separating out the color carrier and its sidebands, hereinafter called the chrominance signal, from the rest of the signals. The color information conveyed by the color carrier or chrominance signal may be extracted by heterodyning it with different phases of the reference wave. This process is normally carried on in what is termed synchronous detectors. However, because it has been convenient to extract the chrominance signal from the rest of the video signal train on a frequency basis, the burst of reference waves will also appear in the portions of the circuit carrying the chrominance signal after separation and, therefore, these bursts are also applied to the synchronous detectors. The synchronous detectors produce direct-current pulses in response to each of the bursts and it has been found that these pulses may upset the operation of the D.-C. level setters. If the D.-C. level setters do not operate properly, the background illumination of the entire image is changed with the result that the proper degree of color saturation is impaired.

Accordingly, it is an object of the present invention to provide means for eliminating the bursts of reference wave from the synchronous detectors of a color television receiver.

It is another object of the invention to provide a circuit for separating out the bursts of reference wave from the detected video signals and for removing the bursts of reference wave from the chrominance signal.

The manner in which these objectives may be achieved according to the principles of this invention will be more clearly understood after detailed consideration of the drawing. A chrominance signal and the attendant bursts appear at a terminal 2 and are coupled via a condenser 4 and gridleak resistor 6 to the first grid 7 of a gating tube 8. The cathode 9 of the gating tube 8 is connected to ground via a resistor 10 and a parallel condenser 12. Positive pulses 14, as indicated in the waveform 16, are applied to a terminal 18. These pulses occur during the presence of the bursts of reference wave and may be derived in any way known to those skilled in the art. For example, they may be derived by multi-vibrators actuated in response to the horizontal synchronizing pulses or they may be derived from the flyback pulses occurring in the yoke or sweep system. The terminal 18 is coupled via condenser 20 and a resistor 22 to the grid 7 of the gating tube 8. The junction between the condenser 20 and the resistor 22 is clamped at ground potential at the positive tips of the pulses 14 by a diode 24. The time constant of the condenser 20 and the resistor 22 is such that the gating tube 8 conducts only during the presence of the pulses 14. In this manner the gating tube 8 is cut off for portions of time occurring between the pulses 14 and is permitted to conduct only during these pulses. Therefore, inasmuch as these pulses occur during the time when the bursts of reference wave are present, the bursts will appear at the plate 26 of the gating tube 8 and the chrominance signal, which is present at the terminal 2, will be eliminated. The load circuit for the plate 26 may be comprised of the parallel-resonant circuit 28 that is tuned to resonance at the frequency of the sub-carrier or in accordance with the present standards at 3.579545 megacycles. The upper end of the parallel-resonant circuit 28 is connected to a suitable source of B+ potential.

The signals applied to the terminal 2, i.e., chrominance signals and the bursts are also coupled to a grid 30 of a triode 32 via a condenser 34 and a gridleak resistor 36. Suitable bias for the cathode 42 of the triode 32 is obtained by a parallel circuit comprised of a resistor 38 and a condenser 40. The chrominance signal appears across a parallel-resonant circuit 44 comprised of an inductance 46 and a condenser 48. Inasmuch as the bursts of the reference wave, also applied to the terminal 2 along with the chrominance signal, have the same frequency as the chrominance signal, they also appear at the chrominance output, i.e., across the tuned circuit 44. As stated above, the presence of these bursts of reference waves in the chrominance signal have harmful effects on the operation of succeeding circuits. Therefore, means are provided for preventing the triode 32 from conducting when the bursts are present. In this particular embodiment of the invention, this means is comprised of a connection or coupling between the grid 30 of the triode 32 and the screen grid 50 of the gating tube 8. The particular coupling network shown is comprised of a resistor 52, a condenser 54, a resistor 56 that is connected between the screen grid 50 and B+, and a series-resonant circuit, tuned to the carrier frequency and comprised of a condenser 58 and an inductance 60, connected between the junction of the condenser 54 and the resistor 52 and ground.

The over-all operation of the circuit just described is as follows: it will be remembered that the pulses 14 occurred during the blanking intervals of the signals, i.e., during a portion of the blanking interval following the horizontal synchronizing pulses and their application to the grid 7 of the gating tube 8 permitted this tube to draw current only during the bursts. Hence, the burst appears at the plate 26 of the gating tube 8. The application of the pulses 14 to the grid 7 also produces a negative D.-C. pulse at the screen 50. In this particular embodiment of the invention, the negative pulse appearing at the screen 50 is coupled via the condenser 54 and the resistor 52 to the grid 30 of the triode 32. The negative pulses are of such amplitude as to cut off the triode 32 and, therefore, prevent the bursts that are applied to its grid from reaching the chrominance output circuit. The parallel circuit 44 removes any low-frequency components that may be present in this pulse. This is important as otherwise these components would appear in a chrominance output circuit and might possibly cause some difficulties in the operation of succeeding stages.

Other configurations or circuit arrangements in which negative pulses are developed as the result of the gating of an electrode in the gating amplifier are possible. For example, the pulse 14 might be applied to the screen grid 50 in which case the negative pulses required to turn off the triode 32 might be taken across a plate decoupling resistor. It is also possible that the negative pulses required to cut off the triode 32 could be taken across a plate decoupling resistor rather than from the screen grid 50.

While we have illustrated a particular embodiment of our invention, it will of course be understood that we do not wish to be limited thereto since various modifications both in the circuit arrangement and in the instrumentalities may be made, and we contemplate by the appended claim to cover any such modifications as fall within the true spirit and scope of the invention.

What we claim as new and desire to secure by Letters Patent of the United States is:

In a color television receiver, a circuit for separating intermittent bursts of carrier frequency from a chrominance signal comprised of amplitude and phase-modulation of the carrier comprising, in combination, a gating amplifier having a cathode, a control grid, screen grid and a plate, a terminal adapted to receive the bursts and the chrominance signal, a condenser and a gridleak resistor connected between said terminal and said control grid so as to couple the bursts and the chrominance signal thereto, a second terminal adapted to receive positive pulses that occur during the bursts, a condenser and resistor connected in series between said latter terminal and said control grid and a diode connected between the junction of said latter condenser and resistor and ground, said diode having a plate connected to said junction, a parallel-resonant circuit connected between the plate of said gating amplifier and source of B+ potential being narrowly tuned to the carrier frequency several cycles of which are contained in each burst, a gated burst output circuit connected to said plate, a second electron discharge device having a plate, grid and a cathode, connections between the plate and B+, a coupling condenser and a gridleak resistor between said first terminal and said grid of said second electron discharge device so as to couple the bursts and the chrominance signal thereto, a first parallel circuit comprised of parallelly connected condenser and resistor, a second parallel circuit comprised of an inductance and a capacitor, connections for placing said first and second parallel circuits in series in the order named between said cathode of said second electron discharge device and ground, a chrominance output circuit connected to the junction of said parallel circuits, the time constant of said first parallel circuit being long with respect to the frequency with which said gating amplifier is gated, said second parallel circuit being tuned so as to be resonant at the frequency of the chrominance signals, a resistor connected between said screen grid of said gating amplifier and B+, a condenser and a resistor connected in series in the order named between said screen grid of said gating amplifier and said grid of said second electron discharge device, said latter condenser and resistor serving to couple the negative pulses appearing at said screen grid when the said gated amplifier conducts to said grid of said electron discharge device thereby cutting it off and preventing bursts applied to said grid of said electron discharge device from appearing at said chrominance output circuit.

References Cited in the file of this patent

UNITED STATES PATENTS

| | | |
|---|---|---|
| 2,649,543 | Trachtenburg | Aug. 18, 1953 |
| 2,743,311 | Richman | Apr. 24, 1956 |
| 2,775,691 | Rennick | Dec. 25, 1956 |
| 2,835,729 | Flood | May 20, 1958 |
| 2,947,806 | Davis | Aug. 2, 1960 |

FOREIGN PATENTS

| | | |
|---|---|---|
| 645,628 | Great Britain | Nov. 1, 1950 |

OTHER REFERENCES

RCA Color Television Receiver, Model CT-100, Service Data pp. 1, 4, 5, 6, and 21, 23, 24.

RCA Service Data, Model CT-100, Color Television Receiver, Mar. 31, 1954, pages 32 and 33.